(No Model.)

J. H. RHOADS & G. H. SPANNAGEL.
FOOD SCREEN.

No. 526,942. Patented Oct. 2, 1894.

WITNESSES:
INVENTORS
J. H. Rhoads
BY G. H. Spannagel
Munn & Co
ATTORNEYS

UNITED STATES PATENT OFFICE.

JOHN H. RHOADS AND GUSTAVE H. SPANNAGEL, OF NOKOMIS, ILLINOIS.

FOOD-SCREEN.

SPECIFICATION forming part of Letters Patent No. 526,942, dated October 2, 1894.

Application filed May 2, 1894. Serial No. 509,769. (No model.)

*To all whom it may concern:*

Be it known that we, JOHN H. RHOADS and GUSTAVE H. SPANNAGEL, both of Nokomis, in the county of Montgomery and State of Illinois, have invented a new and Improved Food-Screen, of which the following is a full, clear, and exact description.

Our invention relates to improvements in food screens; and the object of our invention is to produce a very cheap and simple screen, which may be placed upon a table so as to cover the food and everything else thereon, to protect the said matter from flies and other insects, and also to produce a screen frame which holds the screen over the material on the table and which may be easily knocked down and snugly packed when desired.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
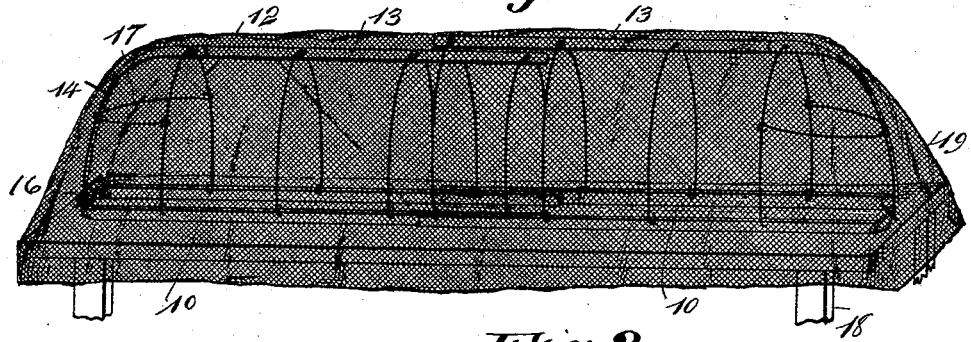
Figure 2:
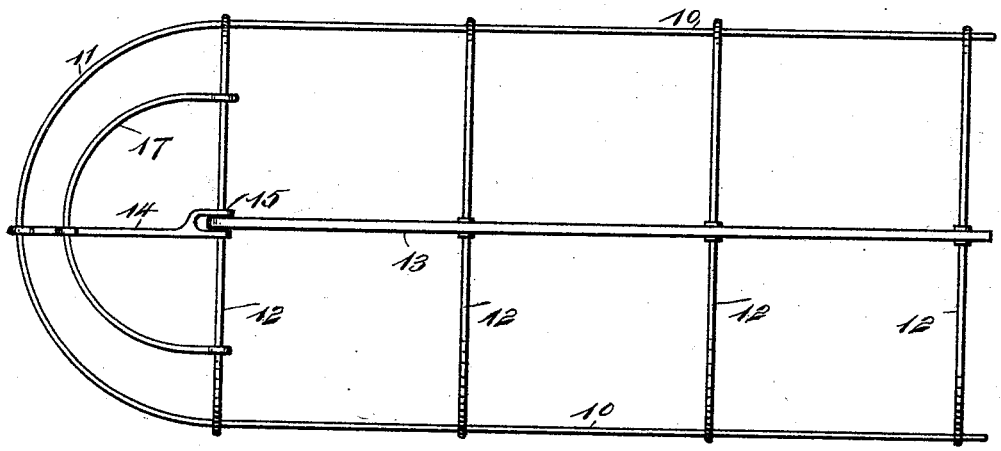

Figure 1 is a perspective view of our improved screen as applied to a table. Fig. 2 is a plan view of the screen frame set up ready for use; and Fig. 3 is a plan view of the frame in a knocked down condition.

Figure 3:
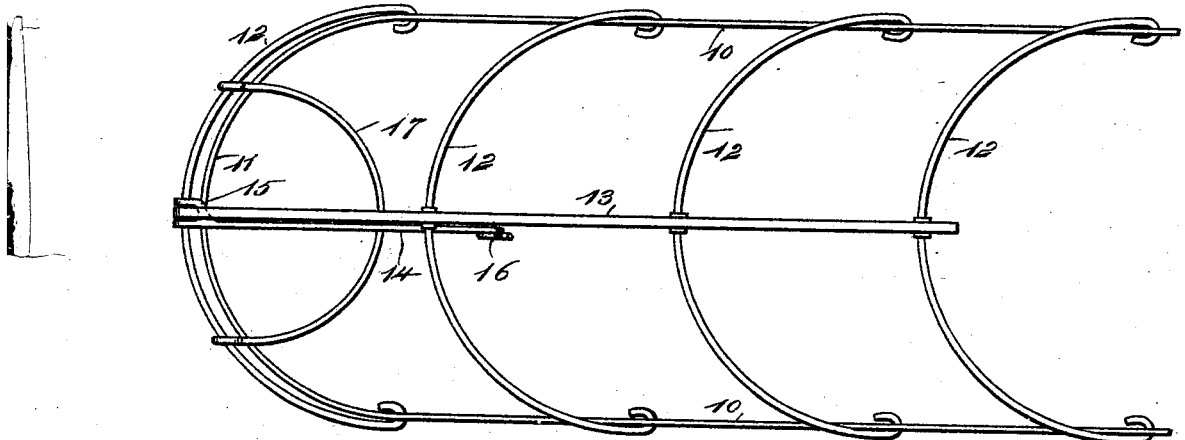

The screen is provided with a base frame 10, which is open at one end and is preferably covered at the other, as shown at 11, and the opposite sides of this frame, which is of a general U-shape, are connected by arched ribs 12 which are pivoted to the sides of the base frame and are adapted to be held upright, as shown in Figs. 1 and 2, or to be turned down into the position shown in Fig. 3, in case the frame is to be packed. The arch ribs are connected at the top by a rod 13, which enables them to all move in unison or to all be locked together, and this rod serves also as a support for the mosquito netting or screen 19 which is placed over the frame, as described below. A locking bar 14 is pivoted at 15 to one end of the rod 13 and is adapted to swing down into engagement with the closed end 11 of the frame 10, and the lower end of the bar has a catch 16 adapted to engage the said frame. To the bar is secured a bail or hoop 17 which is also pivoted to the nearest arch rib 12 and the hoop or bail thus forms an end portion or guard on the main screen frame, see Fig. 1 which prevents the mosquito netting from sagging.

The screen frames may be made of any desired size and in practice two of them are used together, as shown in Fig. 1, the open ends overlapping, and they are placed on the table so as to cover the main part thereof and the screen 19 is thrown over them. The frames are set up by lifting the rods 13 and then securing the catches 16 of the locking bars 14 in the manner described.

By using two screen frames together as described the apparatus may be easily adjusted as to length.

Having thus described our invention, we claim as new and desire to secure by Letters Patent—

1. A screen supporting frame comprising the horizontal frame 10, the arched bars pivotally connected at their ends with the sides of the frame, a longitudinal rod 13 connecting the arched bars and a latch 14 pivoted to one of the end arched bars at the top thereof and having a catch 16 at its free end to engage the transverse end bar of the frame 10 and hold the arched bars raised.

2. A screen supporting frame comprising the horizontal frame 10 the side bars of which are connected at one end and disconnected at one end to permit two frames to be placed end to end, a series of arched bars 12 pivotally connected at their ends to the said side bars, a longitudinal rod 13 connecting the arched bars, a latch 14 pivoted to the arched bar nearest the closed end of the frame and provided at its free end with a catch to engage the end bar 11 thereof and hold the arched bars raised, and an arched bar 17 secured between its ends to the latch 14 and pivotally connected at its ends to curved bar 12 to which said latch is pivoted, substantially as described.

JOHN H. RHOADS.
GUSTAVE H. SPANNAGEL.

Witnesses:
ANDREW J. WILLIFORD,
DENNIS P. BROPHY.